United States Patent Office 3,232,059
Patented Feb. 1, 1966

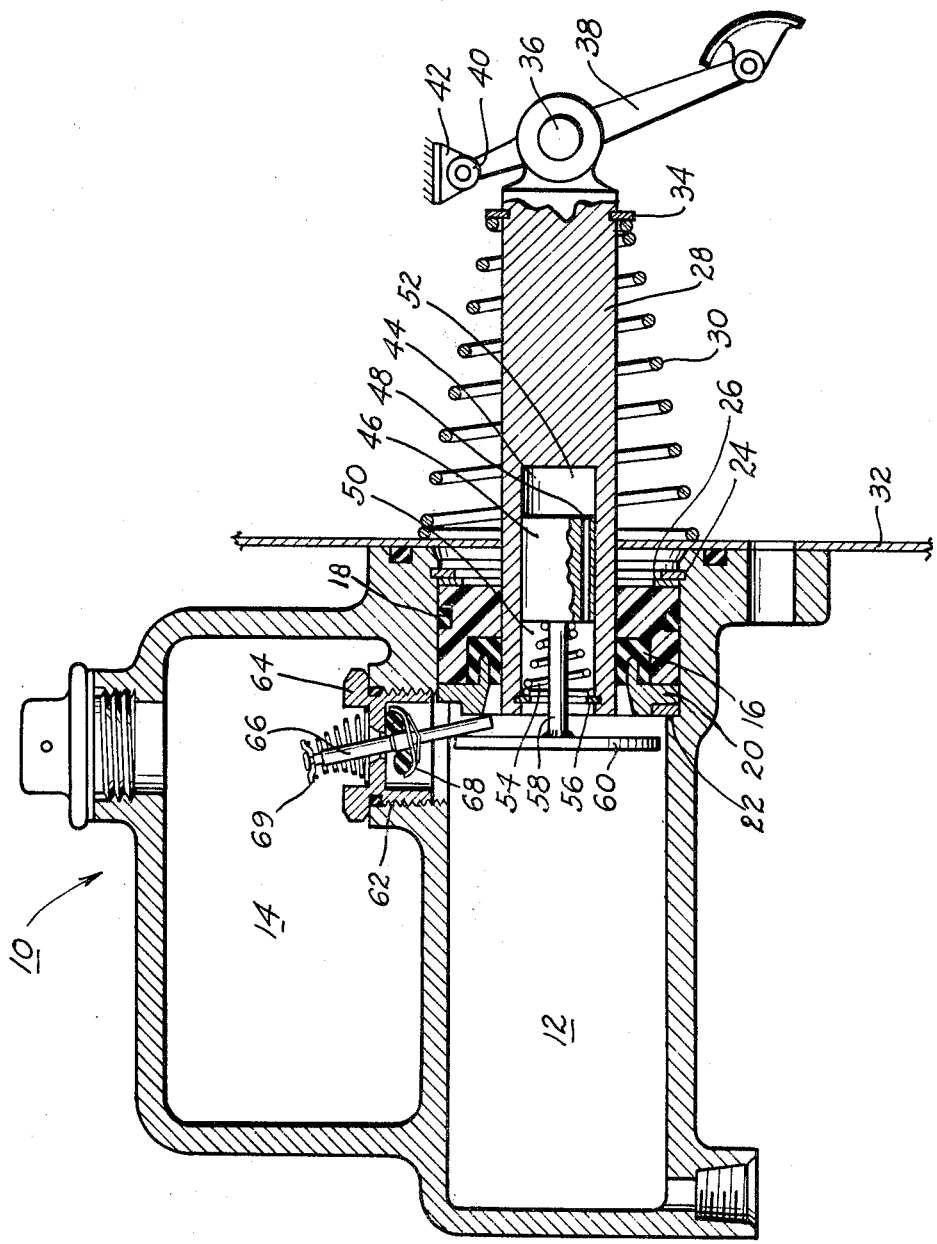

3,232,059
TILT VALVE
Patrick A. Thesier, South Bend, Ind., assignor to The Bendix Corporation, South Bend, Ind., a corporation of Delaware
Filed Feb. 26, 1965, Ser. No. 435,600
4 Claims. (Cl. 60—54.6)

This invention relates to master cylinders and particularly to combined master cylinder and reservoir in which a tilting valve provides a means of communication between the reservoir and cylinder.

An object of this invention is to provide a tilting valve which is tilted off its seat by an edge of a piston in a master cylinder.

It is another object of this invention to provide a dampening means within a master cylinder to preclude the application of full force of a return spring on the piston of a master cylinder to a stem of the tilt valve in the master cylinder in the full release position.

Other objects and advantages of my invention will appear from the following description of the drawing showing a cross-sectional view of a master cylinder employing a tilt valve and dampening means in accordance with the principles of my invention.

More particularly, with reference to the drawing I show a master cylinder 10 having a bore 12 and a reservoir cavity 14 thereabove. As seen, the end of the bore 12 is closed by means of appropriate seal means 16 and 18 held in place by means of a seal retainer 20 resting against a retainer ring 22 and a snap ring and washer 24 and 26, respectively, at the open end of the bore 12. The seals 16 and 18 are provided with central openings receiving a plunger 28 that is normally biased to a rear position by means of a spring 30 compressed between a firewall panel 32 and a spring bearing plate 34 on the plunger 28. In addition, the plunger 28 is connected as at 36 to a brake pedal 38 so that it may be reciprocated within the bore 12 about a pivot 40 of the brake pedal 38 with vehicular structure 42. In the end of the plunger 28 I have drilled a cavity 44 in which I have reciprocably mounted a piston 46 having an axial orifice 48 therethrough leading from one side of piston 46 to the other side of the piston and thereby form a first variable volume chamber 50 ahead of the piston 46 and a second variable volume chamber 52 to the rear of the piston 46 that are communicated by means of the orifice 48. In addition, I have mounted the piston 46 in the cavity 44 by means of a spring 54 compressed in the front variable volume chamber 50 between the piston 46 and a spring retainer 56.

The piston 46 is provided with a forwardly projecting rod 58 that terminates in a plate 60 within the bore 12 which is of substantially greater cross-sectional diameter than the plunger 28.

In order to communicate the reservoir 14 and the bore 12, I have provided a port 62 leading from the reservoir to the bore in which I have threaded a plug 64 that is centrally drilled and receives a stem 66 of a valve 68, which stem extends upwardly into the reservoir 14 and downwardly into the bore 12 and is held to the plug 64 by means of a spring retainer means 69.

In operation, the operator of a vehicle depresses the brake pedal 38 to move the plunger 28 inwardly of the bore 12 to thereby cause the plate 60 to be moved forwardly and release the stem 66 closing the valve 68 and preventing communication of the master cylinder bore 12 and the reservoir cavity 14.

When the plunger 28 goes to the released position, plate 60 abuts on stem 66 and opens valve 68 whose opening is limited by means of the seal retainer 20 due to the impingement of the lower portion of stem 66 thereon. The return spring forces the plunger 28 to continue releasing until the plate 60 has forced the stem 66 against the retainer 20 and the spring 54 has been compressed its maximum amount by means of spring 30. During the compression of spring 54, fluid is forced through the orifice 48 in the piston 46 as the plunger moves rearward. At rest in the released position, spring 54 holds the piston assembly rearward to maintain the valve 68 in the open position. Upon applying the unit, the piston assembly moves forward with the plunger closing the tilt valve as above stated. Since the orifice in the piston restricts the flow of fluid from behind the piston, as well, it will cause the piston to move with the plunger.

In using a master cylinder such as I have suggested with a power servomotor, it is not always desirable to have the full force of the servomotor return means pushing on the stem of the tilt valve in the master cylinder in the full release position. Also, by bottoming (on full release) in the master cylinder, some of the available stroke in the servomotor would be lost, this being a function of the necessarily large tolerance stack-up between compensator valve stem 66, plunger 28 and the brake pedal or similar plunger operator. Having an adjustable push rod allows you to bottom in the servomotor and adjust for a good "travel to close compensator" dimension, but it also necessitates adjusting each unit built individually. The above master cylinder permits bottoming in the servomotor, having good compensator valve adjustment and not having to adjust each unit individually. Thus, it will be seen that the objects of my invention have been accomplished in providing a means of closing the tilt valve 68 with the initial movement of the pedal regardless of the position of the plunger within the range of the tolerance stack-up when in the full release position.

The results of using an idea such as mine may be summarized as follows:

(1) Provides a means of making available a total stroke for a braking application in that none of the available stroke be wasted in taking up slack due to tolerance stack-up.

(2) Provides a means of always having a correct "pedal travel to close valve" dimension regardless of tolerance stack-up across the unit.

(3) Provides a means of eliminating the adjustment of the plunger-operator relationship in each individual unit during assembly.

(4) Provides for an increase in total available stroke in a master cylinder due to the collapsibility of the plunger assembly.

(5) Allows for a simpler design of the rear end of the plunger which could help defray cost of manufacturing.

Although I have shown and described my invention with respect to certain details of construction, it is to be understood that I do not wish to be unduly limited thereto as certain modifications are certainly possible within the scope of my invention as herein below claimed:

I claim:

1. In a combined master cylinder and reservoir, a valve for closing a fluid opening between the reservoir and the cylinder having a stem protruding into the cylinder, a plunger in the cylinder and reciprocatorily mounted to displace fluid from the cylinder;

a plate mounted to a pressure responsive means which is reciprocatorily mounted in a cavity in the forward end of the plunger within the cylinder which plate radially extends to contact said stem upon rearward motion of the plunger to a released condition;

a means for limiting the travel of said stem as directed by the plate; and means for dampening the force applied by said plate to said stem.

2. In a master cylinder and reservoir according to claim 1 a means operatively connected to said stem for maintaining said valve in a normally closed attitude.

3. In a master cylinder and reservoir according to claim 1 wherein said pressure responsive means mounting said plate to said plunger includes a piston dividing said cavity of said plunger into a first variable volume chamber open to the bore of said master cylinder and a second variable volume chamber with an orifice means through said piston for communicating said first and said second variable volume chambers.

4. In a master cylinder and reservoir according to claim 1 wherein said pressure responsive means dampening movement of said plate in said cavity of said plunger includes a spring biased piston having an orifice therethrough for permitting limited flow of fluid from one side of said piston to the other to dampen the effect of forces on said plunger from said stem of said valve.

No references cited.

SAMUEL LEVINE, *Primary Examiner.*